(12) United States Patent
Spiller et al.

(10) Patent No.: US 9,096,105 B1
(45) Date of Patent: Aug. 4, 2015

(54) MODULAR TRAILER HITCH BUFFER

(71) Applicants: Wayne Spiller, Bow, WA (US); Arthur Spiller, Bow, WA (US)

(72) Inventors: Wayne Spiller, Bow, WA (US); Arthur Spiller, Bow, WA (US)

( * ) Notice: Subject to any disclaimer, the term of this patent is extended or adjusted under 35 U.S.C. 154(b) by 0 days.

(21) Appl. No.: 14/025,174

(22) Filed: Sep. 12, 2013

Related U.S. Application Data (63) Continuation-in-part of application No. 13/864,726, filed on Apr. 17, 2013.

(60) Provisional application No. 61/640,142, filed on Apr. 30, 2012.

(51) Int. Cl.
*B60D 1/30* (2006.01)
*B60D 1/50* (2006.01)

(52) U.S. Cl.
CPC ....................................... *B60D 1/50* (2013.01)

(58) Field of Classification Search
CPC ............. B60D 1/50; B60D 1/02; B60D 1/155
USPC .......................................... 280/506, 485, 486
See application file for complete search history.

(56) References Cited

U.S. PATENT DOCUMENTS

| | | | | |
|---|---|---|---|---|
| 1,649,084 A | * | 11/1927 | Sandberg | 280/486 |
| 3,843,162 A | * | 10/1974 | Abromavage et al. | 280/486 |
| 4,191,280 A | * | 3/1980 | Copperwheat | 188/300 |
| 5,380,030 A | * | 1/1995 | Gullickson | 280/486 |
| 5,823,560 A | * | 10/1998 | Van Vleet | 280/484 |
| 6,260,873 B1 | * | 7/2001 | Bishel et al. | 280/486 |
| 6,581,953 B2 | * | 6/2003 | Jerry | 280/486 |

* cited by examiner

*Primary Examiner* — Tony Winner
(74) *Attorney, Agent, or Firm* — Dwayne E. Rogge; Schacht Law Office, Inc.

(57) ABSTRACT

A modular trailer hitch which removably couples to a trailer hitch receiver fixedly mounted to a tow vehicle. The modular trailer hitch comprises a cross arm, and at least one of several disclosed components which may be attached in varying configurations to the hitch receiver.

5 Claims, 8 Drawing Sheets

MODULAR TRAILER HITCH BUFFER

RELATED APPLICATIONS

This application claims priority benefit of U.S. Ser. No. 13/864,726, filed Apr. 17, 2013 and incorporated herein by reference as well as U.S. Provisional Application Ser. No. 61/640,142, filed Apr. 30, 2012 also incorporated herein by reference.

BACKGROUND OF THE DISCLOSURE

A) Field of the Disclosure

This disclosure relates to the field of trailer hitches which comprise a trailer hitch receiver to a trailer hitch with a resilient member to provide shock absorption therebetween in some orientations.

SUMMARY OF THE DISCLOSURE

Disclosed herein is one example of a trailer hitch for a host vehicle having a hitch receiver. The term host vehicle used herein to define a vehicle having a hitch receiver mounted thereto for the function of attaching a hitch thereto when towing a trailer or other implement. The trailer hitch in one example comprising a malleable buffer within a cross member tube to compress and reduce (mitigate) shock damage to the host vehicle with a hitch receiver. The term mitigate intended: to lessen in force or intensity; moderate. The trailer hitch in one example comprising: a cross arm having a first arm with a plurality of surfaces defining voids for attachment and securement to the hitch receiver in a horizontal position and in a vertical position; the cross arm further having a second arm extending at a right angle to the first arm with a plurality of surfaces defining voids for removable attachment of a removable ball bracket thereto at a plurality of positions along the second arm; and wherein as the cross arm is installed in the horizontal position, the second arm is horizontally aligned, and when the cross arm is installed in the vertical position, the second arm is vertically aligned.

The modular trailer hitch as recited above may be arranged where at least one of the associated components is selected from the list consisting of utility carrier, bike rack, extension arm, end-mounted ball bracket, rear step, winch, and pet step.

The modular trailer hitch as recited above may further comprise a winch, removably and pivotably coupled to the cross arm, wherein the pivot is vertically aligned and in line with a ball mounted to the ball bracket.

The modular trailer hitch as recited above may further comprise: an alignment attachment having a back plate removably attached to the second arm by way of at least one surface defining a void through which a pin may be received to fix the alignment attachment to the second arm, the alignment attachment having a wing angularly attached on either transverse side of the back plate so as to transversely guide a trailer toward a vertical centerline of the ball bracket.

The modular trailer hitch as recited above may be arranged wherein the cross arm is t-shaped having a third arm aligned with the second arm wherein the third arm has surfaces defining voids there through for attachment of the ball bracket or other component.

The modular trailer hitch as recited above may further comprise: a rear step removably attached to the cross arm; wherein the rear step is provided exterior of the cross arm; and wherein the rear step is attached external of the hitch bracket so as to protect the hitch bracket and cross member from damage.

A modular trailer hitch for a tow vehicle having a hitch receiver is also disclosed. The modular trailer hitch in one example comprising: a cross arm having a first arm with a plurality of surfaces defining voids for attachment and securement of the first arm to the hitch receiver in a horizontal position and a vertical position; the cross arm further having a second arm extending at a right angle to the first arm with a plurality of surfaces defining voids for removable attachment of a longitudinal member; the cross arm having an index internal width of substantially the same dimension as an index external width of the longitudinal member; the cross arm having an index internal height of substantially the same dimension as an index external height of the longitudinal member; and wherein the second arm is positionably received by the cross arm at a plurality of positions along the second arm by way of removable pins engaged through the surfaces defining voids in the cross arm; and a hitch bracket removably attached to the longitudinal member.

Another example of a modular trailer hitch for a tow vehicle having a hitch receiver is disclosed. The modular trailer hitch comprising: a cross arm having a first arm with a plurality of surfaces defining voids for attachment and securement to the hitch receiver in a horizontal position and in a vertical position; the cross arm further having a second arm extending at a right angle to the first arm with a plurality of surfaces defining voids for removable attachment of a removable ball bracket thereto at a plurality of positions along the second arm; wherein as the cross arm is installed in the horizontal position, the second arm is horizontally aligned, and when the cross arm is installed in the vertical position, the second arm is vertically aligned; a rear step removably attached to the cross arm; wherein the rear step is provided exterior of the cross arm; and an alignment attachment having a back plate removably attached to the second arm by way of at least one surface defining a void through which a pin may be received to fix the alignment attachment to the second arm, the alignment attachment having a wing angularly attached on either transverse side of the back plate so as to transversely guide a trailer toward a vertical centerline of the ball bracket, a winch removably and pivotably coupled to the cross arm wherein the pivot is vertically aligned and in line with a ball mounted to the ball bracket; and wherein the rear step is attached external of the hitch bracket, winch, and alignment bracket so as to protect the components from damage.

DESCRIPTION OF THE PREFERRED EMBODIMENTS

Figures 1, 2:
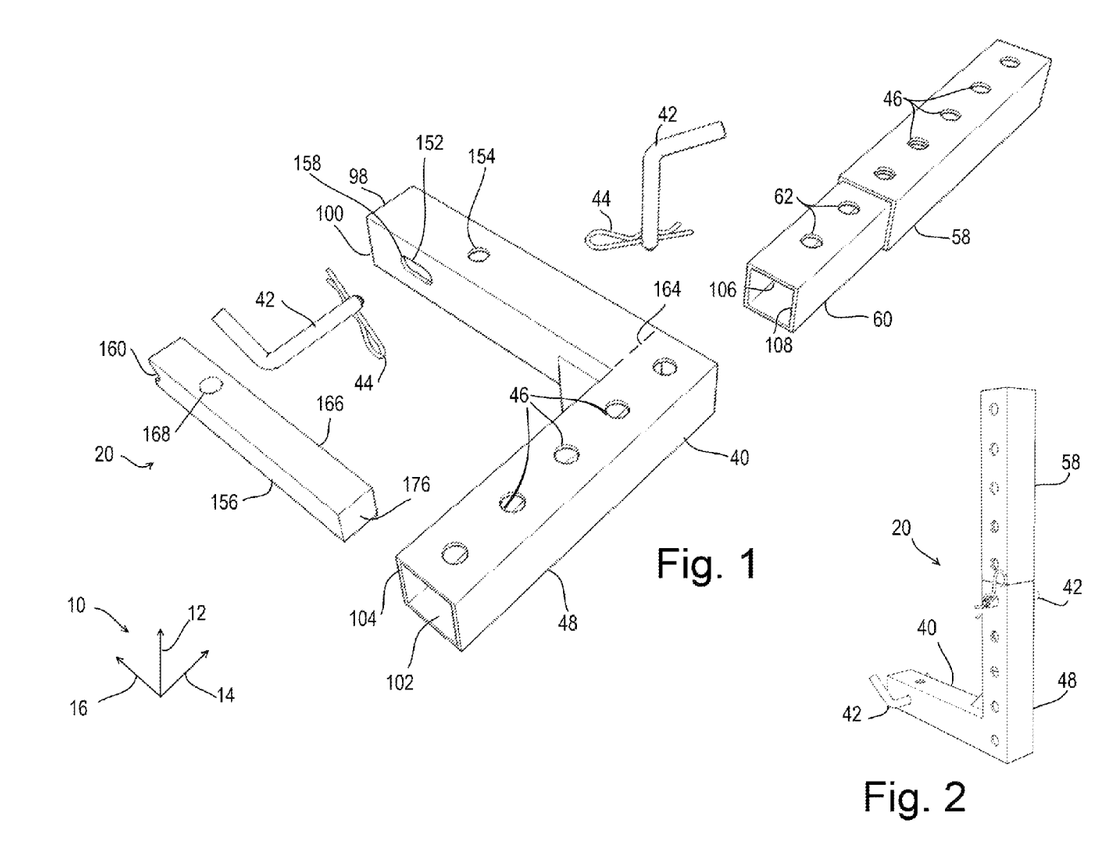
FIG. 1 is an isometric view of one example of the disclosure.
FIG. 2 is an isometric view of the example of FIG. 1 in a different configuration.

Before beginning any detailed description of this invention, an axes system 10 is shown in FIG. 1 which generally comprises a vertical axis 12, a transverse axis 14, and a longitudinal axis 16. Generally, this axes system and the directions indicated are used for reference only and are not intended to limit the apparatus to any particular orientation, especially as the apparatus can be repositioned in multiple orientations as will be discussed in detail in this disclosure.

Disclosed herein is a multi-functional hitch developed after 35 years of express delivery service of fragile and perishable cargo shipments. This convenient hitch assembly was developed for daily fresh market deliveries of temperature/time sensitive products to enable multiple delivery truck-trailer units to deliver sensitive pharmaceutical products and 'back-haul' express delivery products by transferring trailers to various types of towing vehicles. The disclosed hitch assembly has been revolutionary and was developed over time to facilitate tool-free exchanging of trailers to various tow vehicles. Profitability and efficiency have been improved by eliminating 'unloaded' back-haul miles, establishing a viable route system.

With limited equipment available for our specialized needs and faced with daily transfers of light-delivery trailers to different contract haulers, it was undertaken to overcome the challenge of creating highway legal equipment to meet our unique needs. Out of necessity, the disclosed hitch assembly was designed and developed to use with trailers towed by high-mileage light delivery, fuel efficient, express up-fitted trucks. Versatile delivery units were designed which were inexpensive but strong and multi-functional where needed.

Equipment versatility needed to secure return freight was found to be an economic reality due to the ability to reconfigure the hitch assembly to multiple needs. In addition, the apparatus has been found beneficial to be able to exchange trailers, rather than transferring loads between vehicles. This procedure was found to save time, labor and damage from exposing the fragile cargo to the elements, with sealed units remaining sealed, as each trailer is quickly transferred between various sized vehicles of contract carriers each day, without handling the load itself, nor requiring expensive lift equipment commonly used in cargo units etc.

The development of a safe and dependable tow hitch assembly that could be adjusted, and adapted without tools, to substantially any size, type, or style of tow vehicle or trailer became very beneficial. This was accomplished by the disclosed hitch assembly which is in many embodiments convertible without the use of tools and allows operators to connect with different types of conventional equipment to accommodate numerous routes and suppliers daily with various sized trucks towing the same trailer.

The modular trailer hitch disclosed herein was developed to provide the aforementioned adjustable functions, and many other numerous and often valuable, and necessary uses have evolved through trial and error. This modular trailer hitch will replace most of the numerous hitches previously required in tow vehicles to be able to match the different hitches of the various styles and sizes of trailers towed throughout the country.

Figure 22:
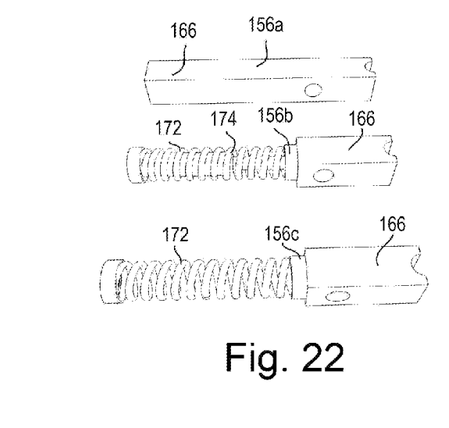
FIG. 22 is an isometric view of three examples of a resilient member.

The hitch assembly when combined with a resilient member such as shown in FIG. 22 provides resiliency to the apparatus for use in reducing damage caused by rear impact. Recent lawsuits and recalls of vehicles due to injury and death caused in part by insufficient rear impact protection may be alleviated by such an apparatus. When installed, the cross member forms a barrier to contact from behind, and the resilient member reduces shock impact resultant from rear impact.

In some jurisdictions it is no longer permitted to leave a trailer hitch protruding longitudinally from a vehicle. Thus, storage of the hitch components can become a nuisance. It is anticipated that the disclosed apparatus will overcome such nuisance and provide storage of the covered/protected hitch components on the vehicle.

Figure 17:
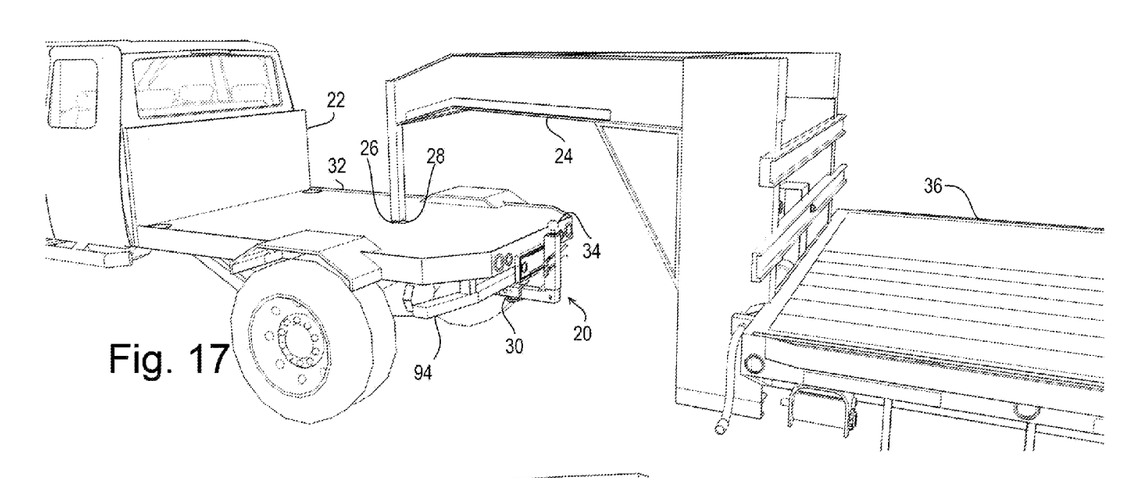
FIG. 17 is an isometric environmental view of the example of FIG. 1 in yet another configuration with a gooseneck style trailer.
Figure 18:
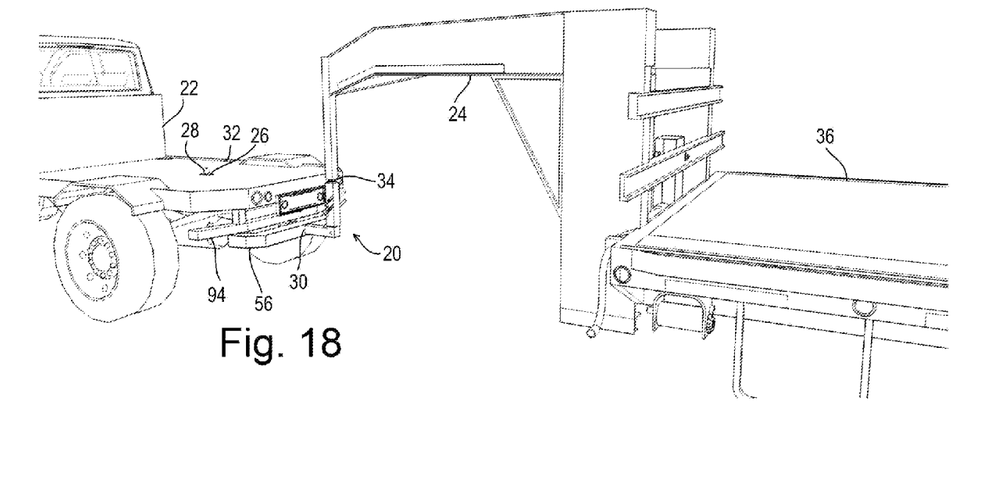
FIG. 18 is an isometric environmental view of the example of FIG. 17 with the trailer hitch assembly in another configuration.

Thanks to the disclosed modular trailer hitch, one assembly is all that is required for each tow vehicle, where several hitches and hitch adapters had previously been required. For example, looking to FIG. 17 is shown a tow vehicle 22 with a gooseneck style trailer 24 having a forward ball hitch 26 (forward of the rear bumper 94) which engages a ball receiver 28 positioned in the bed 32 of the tow vehicle 22. While this position works well for towing a heavy load, having the ball hitch 28 in the center of the truck bed significantly reduces the carrying capacity of the overall apparatus for lighter loads. Thus, the one example of the modular hitch assembly 20 may be attached to a standard trailer hitch receiver 30 and extend longitudinally and vertically therefrom to provide a second ball 34 which is positioned at the longitudinal rear end of the vehicle allowing for the entire bed 32 of the tow vehicle 22 to be utilized for storage and transport along with the bed 36 of the trailer 24. FIG. 18 shows the trailer 24 mounted in such an arrangement to a ball 34 which is mounted to the upper portion of the modular hitch assembly 20 as described. By increasing the available deck for example, a delivery route may become profitable, for example by back-hauling bulky, light containers one direction for a manufacturer where this was not possible before. The modular hitch assembly as disclosed enables a light duty, fuel efficient truck for example, to carry a light bulky truckload, equivalent to a commercial carrier load, at a competitive, yet profitable rate, after delivering the heavier equipment in the goosenenck configuration (FIG. 18) on the forward route. The modular hitch assembly makes this conversion possible in moments. Especially with the rising cost of fuel, the value of this feature is obvious.

The hitch receivers come in may different sizes, and configurations including a class 3 receiver, and class 4 receiver. These may also be configured for different tow capacities, for example light, medium, or heavy loads. These receivers often have internal receiving dimensions of 1", 1.5", and 2". Although normally square in cross section, they may be rectangular, cylindrical, or other shapes.

Figure 13:
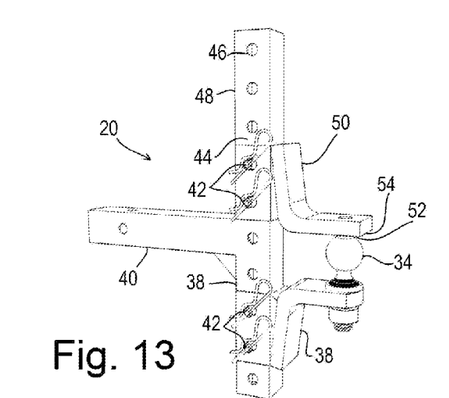
FIG. 13 is an isometric environmental view of the example of FIG. 1 in yet another configuration.

Looking to FIG. 13, an example is shown which is used to couple the tow vehicle to a trailer with a Pintle style trailer hitch rather than a ball receiver style hitch. In this example, the ball 34 is attached to a bracket 38 which attaches to a cross member 40 by way of a plurality of pins 42 which may be retained by Cotter pins 44 or equivalent devices. In one example as can be understood looking to FIG. 1, the cross member 40 has an outer index width 98 and an outer index height 100. These dimensions will generally be equivalent, and of a standard dimension to securely fit within the hitch receiver 30 of the tow vehicle. The cross member in several portions may also have an inner index width 102 and inner index height 104. These inner index dimensions 102/104 will generally be equivalent. In one form, the cross member 40 includes a plurality of surfaces defining voids 46 in a first arm 48 of the cross member 40. This allows for varying (vertical) adjustability of the bracket 38 relative to its vertical above ground. As a Pintle style hitch utilizes a ring rather than a female hemispherical ball receiver, a bracket 50 may be provided which may also attach to the first arm 48 by way of pins 42 or equivalent fasteners. Once the ring portion of the Pintle style hitch is in place about the ball 34, the bracket 50 is positioned (lowered) there above providing insufficient space (gap) between the upper surface 52 of the ball 34 and the lower surface 54 of the bracket 50 for the thickness of the ring of the Pintle hitch to pass. This example allows for both Pintle style hitches as well as ball style hitches to be utilized in a single apparatus such as the modular trailer hitch assembly 20.

Figures 3, 4, 5, 6:
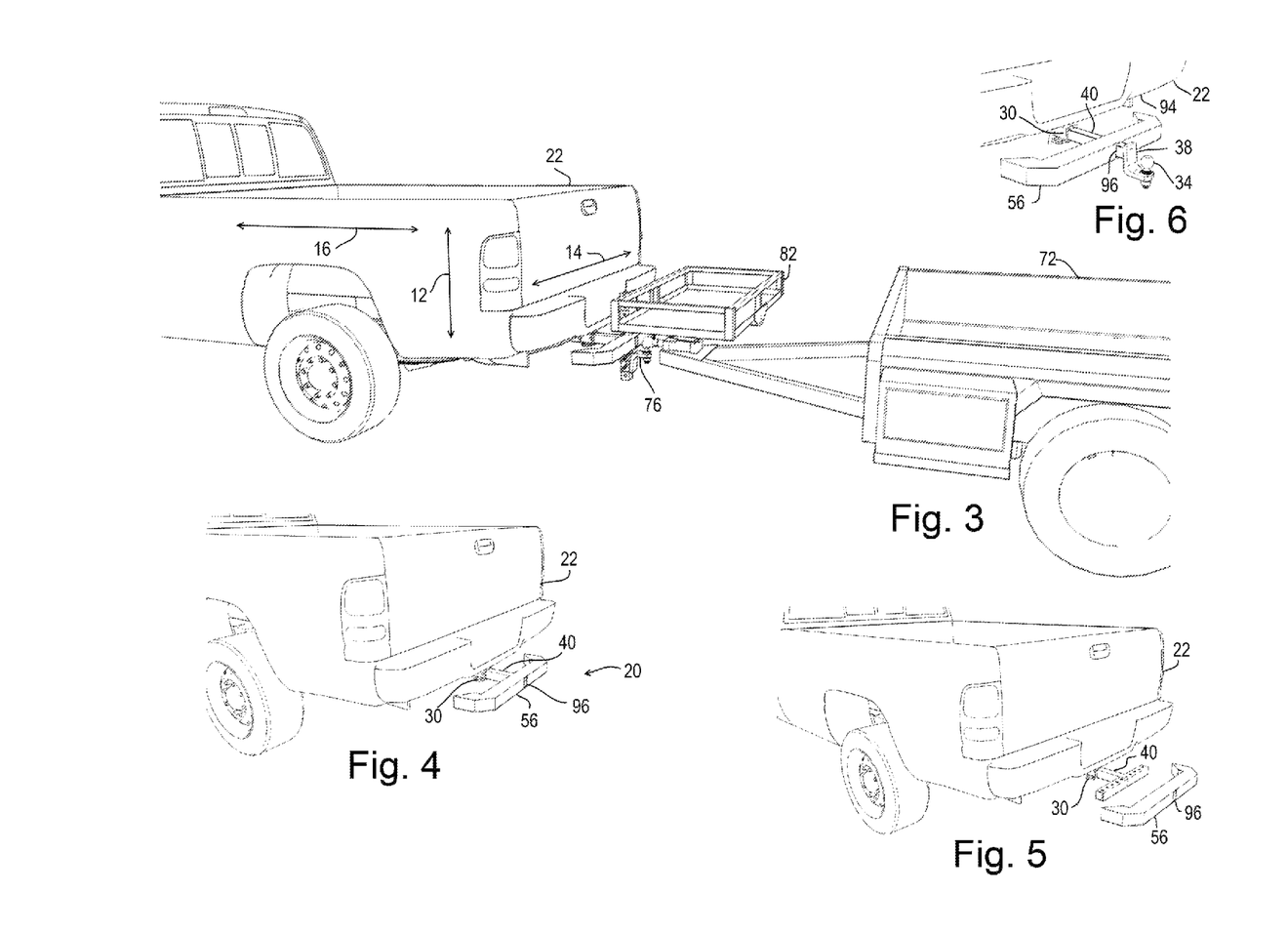
FIG. 3 is an isometric environmental view of the example of FIG. 1 in yet another configuration.
FIG. 4 is an isometric environmental view of the example of FIG. 1 in yet another configuration.
FIG. 5 is an isometric partially disassembled environmental view of the example of FIG. 4.
FIG. 6 is an isometric environmental view of the example of FIG. 1 in yet another configuration.

Looking to FIG. 6, an example utilizing a rear step or guard 56 to access the rear of the tow vehicle 22 and protect portions of the hitch assembly is shown. The rear step 56 in one example having a surface defining a void 96 for acceptance of other components for attachment there through such as a hitch bracket 38. In addition to providing a place to stand, the rear step 56 may also protect the rear bumper 94 of the tow vehicle 22 from rear impact damage, eliminating costly repairs in use with standard hitches. In one form, the step 56 attaches to the cross member 40 previously described, which attaches to the hitch receiver 30 mounted to the tow vehicle 22.

The step 56 in one example provides a push bar, for emergency situations, for example when a disabled vehicle is stopped in a dangerous location. As the step itself may be damaged, it may be desired to use the L-shaped cross member 40 shown in FIG. 1, or T-shaped cross member 88 shown in FIG. 19 in a vertically or horizontally oriented position with or without the step 56. It may also be desired to utilize the extension arm 58 for this application to extend protection of the device.

Figure 16:
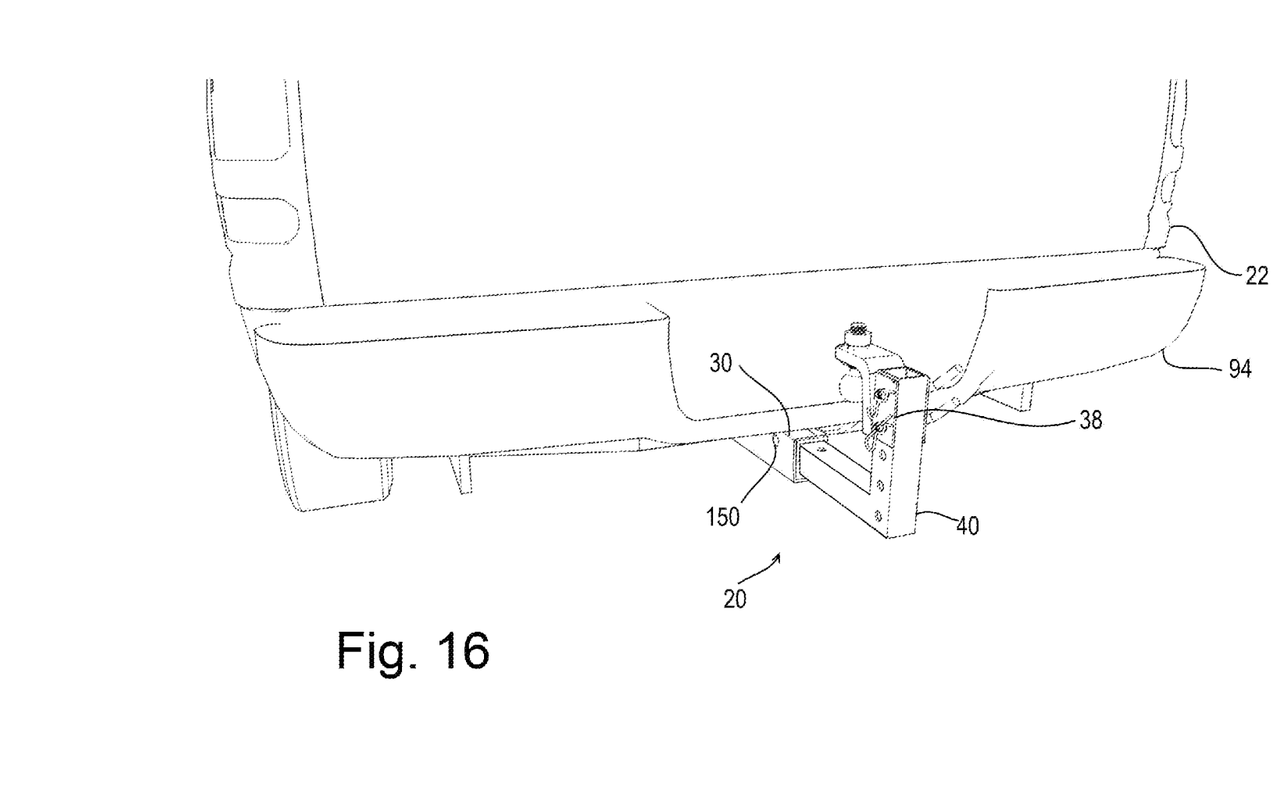
FIG. 16 is an isometric view of the example of FIG. 1 in yet another configuration.

When a disabled vehicle must be moved, assistance to the person attempting to push the vehicle may be invaluable to avoid a multi-vehicle accident. A pushing vehicle's bumper may damage the rear bumper of the disabled vehicle. Installing a modular hitch assembly 20, in the hitch receiver 30 of a disabled vehicle may be utilized to protect the disabled vehicle. Once having protected the disabled vehicle, the disabled vehicle can be pushed to safety. Looking to FIG. 16, the same function can be accomplished by placing the crossmember 40 in a vertically upward pointing orientation, (or alternatively in a downward pointing orientation) to provide additional protection to the disabled vehicle from the pushing vehicle in the disabled vehicle. In almost all instances, the guard should be removed when using the apparatus to protect a vehicle being pushed. In this way, the pushing vehicle pushes on the hitch assembly.

FIG. 5 shows the rear step 56 removed from the cross member 40.

Figure 14:
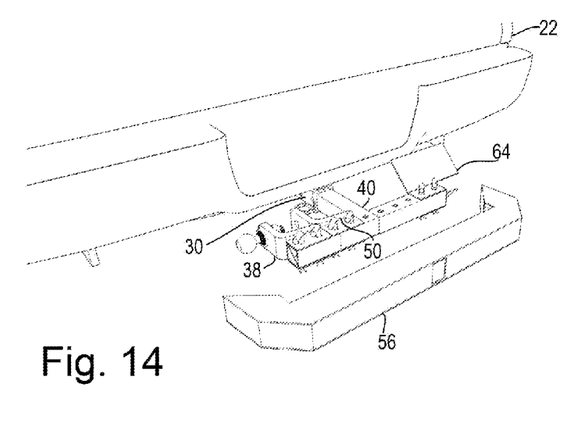
FIG. 14 is an isometric environmental partially exploded view of the example of FIG. 1 in yet another configuration.
Figure 15:
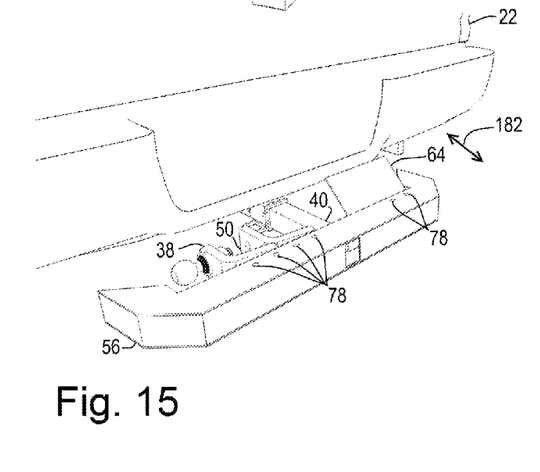
FIG. 15 is a fully assembled view of the example of FIG. 14.

FIG. 15 shows another example of the rear step 56 which is used as a storage location for an alignment device 64, bracket 38 having a ball thereon, as well as a bracket 50 each previously described. In this example, a different style (flat head) retaining pin 78 may be used, to reduce the negative effects of the pins on the use of the rear step 56 as a stepping device as understood by looking to the pins protruding from the device in FIG. 14. Similar embodiments may be provided as dress up (ornamental) kits to cover the internal components. These dress up kits may be made of plastic or other materials where structural support may not be required. These dress up kits may also protect the components therein from the elements such as rain, snow, and sun which can be detrimental.

In one example, the rearward surface of the rear step guard 56 comprises a rubber or rubber-like, malleable, resilient covering to reduce impact from rear collisions.

Looking to FIG. 1, in addition to the cross member 40, an extension arm 58 may be provided having a section 60 of reduced outer dimension which fits within a portion of the cross member 40. To this, the section 60 may have a reduced outer index width 106 only slightly smaller than the inner index width 102 and a reduced outer index height 108 only slightly smaller than the inner index height 104. The dimensions 106/108 may be substantially equivalent. Again, a plurality of voids 62 may be provided such that at least one pin 42 passes through the cross member 40 as well as through the extension arm 58 to hold the extension arm 58 in place partially within the cross member 40. The extension arm 58 can be used in combination with the cross member 40 in the pushing assembly described above, or may be attached in other ways. While in FIG. 1 the extension arm 58 is shown being attached to the right hand portion of the arm 48, it may alternatively be attached at the left hand portion in the same manner. In FIG. 2, the extension 58 is shown attached in this way.

Figure 11:
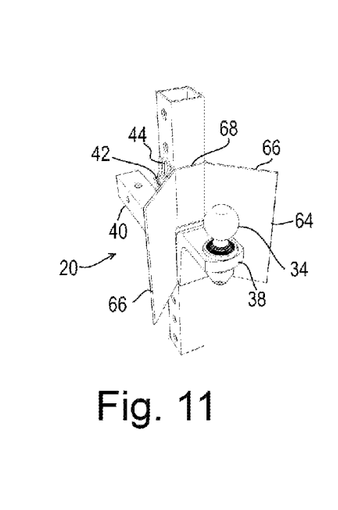
FIG. 11 is an isometric environmental view of the example of FIG. 1 in yet another configuration with a coupling alignment device.
Figure 12:
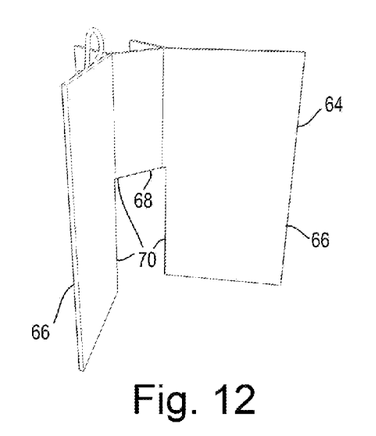
FIG. 12 is an isometric environmental view of the coupling alignment device component of the example shown in FIG. 11.

Looking to FIG. 12 is shown one example of an alignment attachment 64 having a plurality of wings 66 on either longitudinal side and a back plate 68 there between. The alignment attachment 64 also has a surface 70 defining an opening which fits around a hitch bracket 38, as shown in FIG. 11. This alignment attachment 64 can be readily attached to the modular hitch assembly 20 in the manner previously described. The alignment attachment 64 may be utilized for example to assist a driver in connecting to a trailer when alone. This alignment attachment 64 also assists a driver in hooking to a trailer in the dark, on a slope, or in other places where it is difficult to align the receiver of the trailer with the ball 34 of the hitch. In use, as the vehicle is backed up to couple with the trailer, the wings 66 may engage the ball receiver and align the ball receiver 86

(FIG. 7) with the ball 34. If the driver backs up until the ball receiver contacts the back plate 68, a tactile and possibly audible response will inform the driver of contact. The alignment attachment 64 can be attached and removed from the cross member 40 very easily, in one example simply by removing the pins 42/44 and then sliding the alignment attachment 64 off the cross member 40.

Figure 11A:
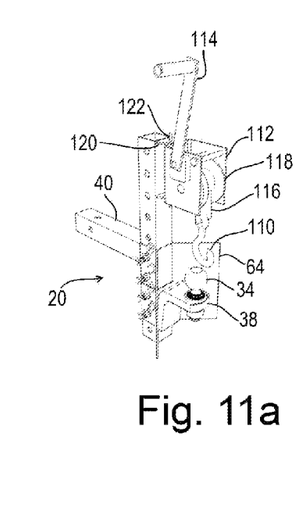
FIG. 11a is an isometric environmental view of the example of FIG. 11 with a winch assembly attached thereto.

FIG. 11a shows an apparatus which effectively aligns the disclosed apparatus with a trailer. For example, to align the ball receiver 28 of a trailer with the ball 34 of the hitch assembly, an operator could back the tow vehicle close to the trailer to generally align the ball receiver 28 to the ball 34. As these components are generally very difficult to see from the driving position of the tow vehicle, exact alignment is difficult. Once generally aligned and proximal, a hook 110 or equivalent of a winch 112 may be connected to the trailer near the ball receiver 28. The winch may then be operated such as by turning the handle 114 to wind a strap 116 onto a reel 118. Of course electric winches could be used, as well as cables and/or ropes. The use of a webbing strap has been found to have additional utility in alignment of the trailer to the tow vehicle. As the extended length of the strap 116 is reduced, the tow vehicle and trailer are drawn to each other, and the alignment attachment 64 may be utilized as described above.

In one example, the winch 112 is removably attached to the cross arm 40 by way of pins 42 as described above relevant to other attachments. Additionally, the winch 112 may be attached through a vertically aligned pivot 120 comprising a plurality of horizontally extending plates and a pivot pin 122. It has been found that when the pivot pin 122 is aligned with the ball 34, the winch 112 will pivot to align to the trailer and will draw the ball receiver 28 directly over the ball 34 for easy connection thereto. As many trailers have an extendable brace and optional trailer jack 178 at the front thereof, and as this brace often has a wheel 180 on the bottom thereof, movement of the trailer is relatively easy. Alternatively, if the tow vehicle is easily moved, the tow vehicle may be drawn to the trailer or a combination thereof.

Figure 8:
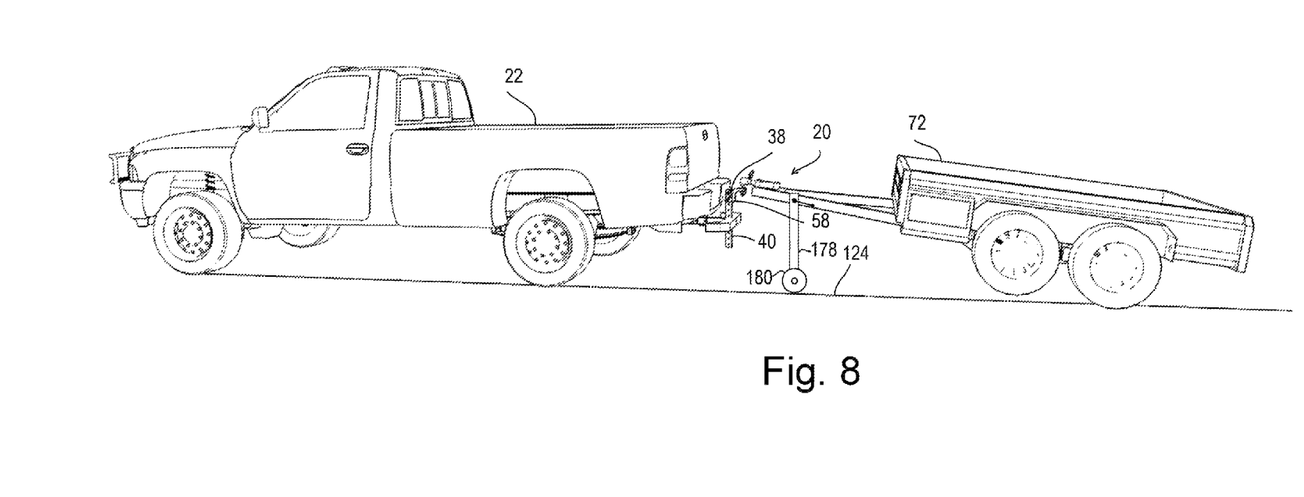
FIG. 8 is an isometric environmental view of the example of FIG. 1 in yet another configuration with a trailer in a raised or loading (unloading) position.
Figure 9:
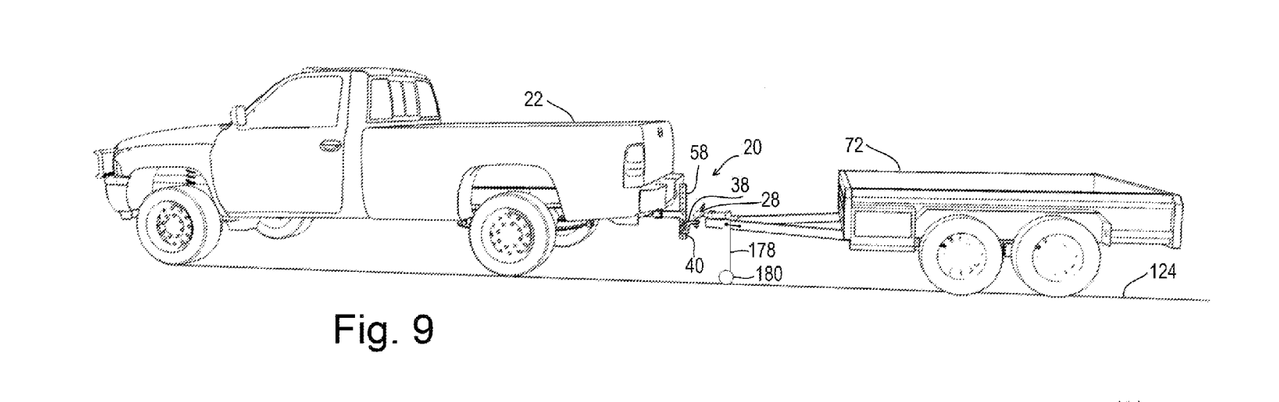
FIG. 9 is an isometric environmental view of the example of FIG. 8 with the trailer in a level or towing position.
Figure 10:
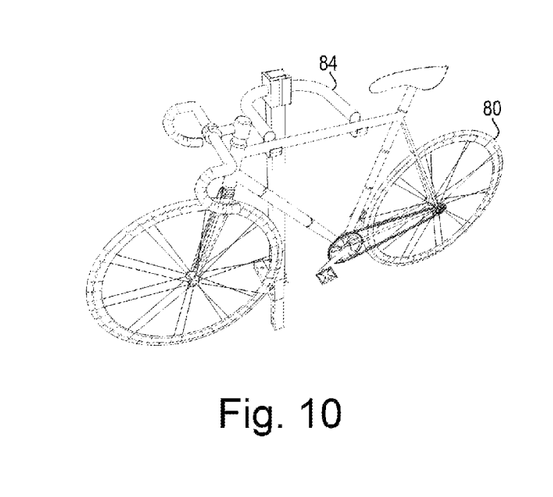
FIG. 10 is an isometric view of the bicycle rack component with a bicycle thereon.

The modular trailer hitch 20 may also be used to adjust the angle of a trailer 72 before, after, or during loading, as shown in FIGS. 8-9. The plane or profile of trailers often change with loading and unloading of either the truck or trailer, causing the deck of the trailer to either tilt forward or back resulting in the load shifting. An unleveled trailer can be a serious problem when hauling livestock for example, often resulting in injury to occupants either human or animal on a wet and potentially slippery trailer floor. The modular trailer hitch 20 is designed to allow the forward portion "tongue" of the trailer to either raise as shown in FIG. 8 relative to a level orientation, or lower, by adjusting the position of the bracket 38 on the cross member 40 or extension 58. The ball 34 can be quickly adjusted up or down to match the required position and re-attached to the cross arm 40 or extension 58.

This feature is very useful when loading or unloading equipment with a minimum ground clearance. By changing the plane of the trailer for example, loading ramps may be utilized with smaller angles from the trailer bed to the ground 124. Once loaded, the trailer may be leveled, the bracket 38 adjusted, and a new trailer angle may be achieved.

Auxiliary receiver hitch equipment currently on the market generally occupies the hitch receiver 30, and thus storing a pet step, pet carrier, bicycle 80, utility carrier 82, rear step 56 etc. is not possible in multiple (combination) configurations. This can result in the unused equipment being lost or unavailable when needed.

Figure 7:
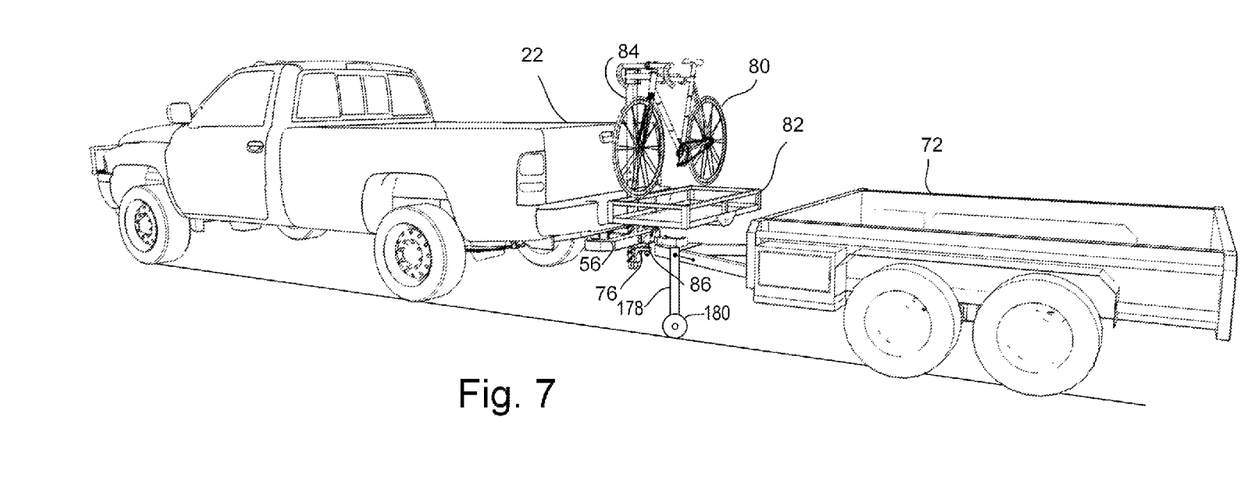
FIG. 7 is an isometric environmental view of the example of FIG. 1 in yet another configuration.

The modular hitch assembly 20 does allow multiple configurations, as shown in FIG. 7 where the cross member 40 allows for connection of a bicycle rack 84 holding a bicycle 80, along with a rear step 56, bracket 76 which as shown is attached to a ball receiver 86 below a utility carrier 82 (which may be tilted sideways for loading and/or unloading) and in combination still allows for attachment of a trailer 72. This is accomplished by combining components with interoperating index surfaces as previously described where for example the utility carrier 82, bicycle rack 84, alignment attachment 64, bracket 50, hitch bracket 38 etc. all utilize the same index surfaces 98-104 and center to center pin hole distance and diameter for attachment of pins 42.

The utility carrier 82 may be provided in varying sizes, and may be provided in a size and configuration for use as a pet step to help a dog, cat, or other pet into the bed or rear portion of the tow vehicle 22.

Unlike current hitches on the market, the modular hitch assembly 20 provides continuous protection for the back of a vehicle while in a storage/guard position. Because many components of the hitch assembly 20 can be stored on the vehicle, the equipment is not likely to be lost, misplaced, or unavailable. In a storage configuration, the modular hitch assembly does not significantly protrude longitudinally from the vehicle as shown by longitudinal offset indicator 182 shown in FIG. 15.

Figure 19:
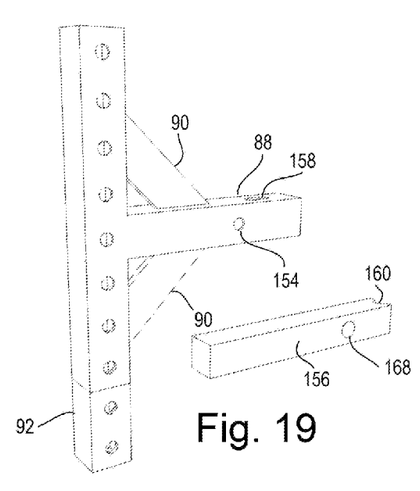
FIG. 19 is an isometric environmental view of the example of FIG. 1 with a resilient member in yet another configuration.

FIG. 19 shows a similar example, with a T-shaped cross member 88 having a plurality of gussets 90. Many other components and aspects of this example are the same as those disclosed above. In addition, a slightly different extension arm 92 having fewer holes, and a shorter body than the extension arm 58 shown in FIG. 1. It can be appreciated that the index surfaces 98-104 of the cross member 40 may be equivalent to the same surfaces as the cross-member 88 for cross-utilization. Both of these extension arms may be used to "balance" the apparatus about the portion that fits into the receiver. This is especially important when used in a horizontal orientation.

Figure 20:
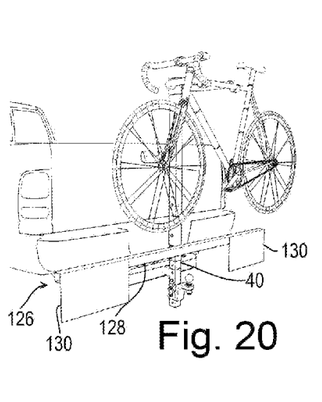
FIG. 20 is a rear isometric view of a plurality of debris stopping flaps attached to a bar extending from one example of the example of FIG. 1.

FIG. 20 shows a protective device 126 generally comprising a transversely oriented bar 128 attached to the cross member 40 by way of the pins 42 as previously described. A pair of flaps 130 hang from the bar 128 and protect a trailer, bicycle, or other device from mud, dirt, and debris thrown by the tires of the tow vehicle 22.

Figure 21:
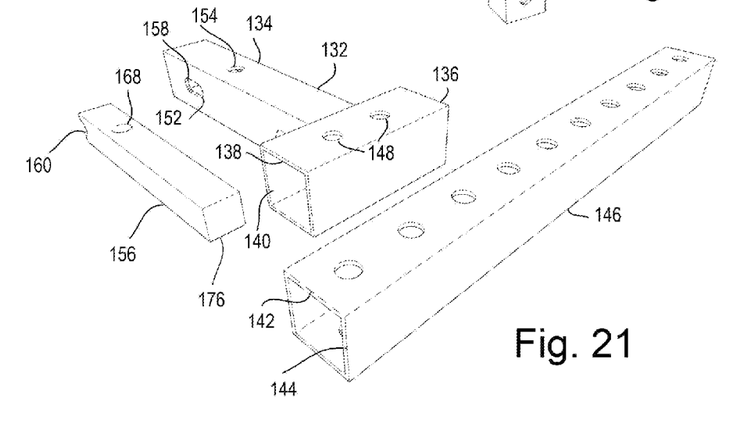
FIG. 21 is an isometric view of one example of the disclosed apparatus.

FIG. 21 shows a variation of the t-shaped cross member 88 comprising a t-shaped member 132 having a first arm 134 which fits into a hitch receiver 30 as previously described. A cross portion 136 has an index interior width 138 and index height 140 substantially the same as an index exterior width 142 and index exterior height 144 of a longitudinal member 146 respectively. As with the previous examples, a slight gap may be provided to allow the components to slide relative to each other until the pins or other fasteners are employed. In one example these respective height and width dimensions shall be equivalent forming a square. In one form, the exterior height and width dimensions of the member 146 are equivalent to the exterior index dimensions of the cross members 40 and 88 to allow interconnection of the components. A plurality of voids 148 are provided to that when longitudinal member 146 or another component such as extension arm 58 is inserted thereto, pins 42 may be employed to fix their relative position. The longitudinal member 146 has the capability of being positioned at many different positions within the cross portion 136 to allow for a wide range of vertical and/or horizontal position options, depending on how the first end 134 of member 132 is inserted into the hitch receiver 30.

To install the hitch assembly upon a tow vehicle 22, the cross member 40 is positioned within the hitch receiver until a transverse pin receiver void 150 (FIG. 16) is aligned with a transverse pin cross member void 152 (FIG. 1) when installed in a first position (FIG. 4) or a vertical pin cross member void 154 when installed in a second position (FIG. 9). A pin 42 is then positioned through the voids. In one example the pin 42 is secured by a (R-style) cotter pin 44. In one example, the voids 150/154/168 may be only slightly larger than the outer diameter or surface of the pin 42 so as to allow passage but prohibit substantial movement of the cross member 40 relative to the hitch receiver 30.

Looking to FIG. 1, an example of a cross member 40 is shown wherein at least one of the voids (transverse pin cross member void 152) is elongated. When this elongated or oversized (relative to pin 42) void is used to secure the cross member 40 to the hitch receiver 30 in storage position, substantial movement is allowed there between. In such an application, a resilient member 156 may be positioned to bias the pin towards the rear end 158 of the void 152. In one example (FIG. 1) the resilient member comprises a groove 160 or other receiving surface may be provided to properly position outer surface 166 the resilient member 156 within the inner surface 162 of the cross arm 40. When the cross member 40 is impacted from behind, the resilient member 156 temporarily shortens in length, and thus reduces the impact shock felt by the host vehicle 22. Upon removal of the force imparted, in most examples the resilient member 156 will be biased back to a full length. The term resilient is used herein to define a component that returns to the original form or position after being compressed. In one form, the resilient member compresses ¾" to 1", requiring the void 152 to be ¾" to 1" longer longitudinally than the pin 42.

To facilitate operation, a barrier 164 may be provided to retain the front end 176 of the resilient member 156 in position. The barrier may be internal to the cross member 40 and is shown by position in FIG. 1.

As can also be seen in FIG. 1 the vertical pin cross member void 154 is longitudinally offset from the transverse pin cross member void 152. This offset enhances the structural integrity of the apparatus. In one example, a vertically aligned void 168 may be provided in the resilient member 156 to align with the void 154 when the cross member is positioned offset from when the void 152 is utilized. In one example, in this position, no impact resistance is provided by the assembly.

Looking to FIGS. 19 and 21, examples other embodiments are shown with the same components as those just described. In these examples, the resilient member 156 may be utilized in the same manner as just described.

Figure 23:
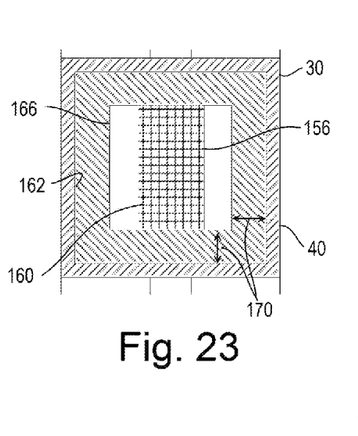
FIG. 23 is an end view of one example of the resilient member within a cross member.

Looking to FIG. 22, three examples of the resilient member 156 are shown. Example 156*a* is an example using a unitary body resilient member which deforms to provide shock resistance. Looking to FIG. 23, it can be seen how a gap 170 may be provided vertically and/or transversely between the outer surface 166 of the resilient member 156 and the inner surface 162 of the cross member 40. This is to allow vertical and/or transverse expansion of the resilient member 156 as the resilient member 156 contracts longitudinally when impacted. Example 156*b* utilized a compression spring 172 and a pneumatic or hydraulic cylinder 174. Of note, the term cylinder is not necessarily indicative of the shape, but rather a function. Such a cylinder (also called a linear motor) is a mechanical actuator that is used to give a unidirectional force through a unidirectional stroke. It has many applications, notably in construction equipment (engineering vehicles), manufacturing machinery, and civil engineering. This example functions in the same manner as a shock and shock absorber common in the automotive industry for drive suspension systems.

While the present invention is illustrated by description of several embodiments and while the illustrative embodiments are described in detail, it is not the intention of the applicants to restrict or in any way limit the scope of the appended claims to such detail. Additional advantages and modifications within the scope of the appended claims will readily appear to those sufficed in the art. The invention in its broader aspects is therefore not limited to the specific details, representative apparatus and methods, and illustrative examples shown and described. Accordingly, departures may be made from such details without departing from the spirit or scope of applicants' general concept.

We claim:

1. A hitch assembly for a host vehicle equipped with a hitch receiver, the hitch assembly comprising:
   a) a cross member having an outer surface smaller than an inner surface of the hitch receiver so as to positionably fit therewithin,
   b) the hitch receiver having a surface defining a transverse pin receiver void there through;
   c) the cross member having a surface defining a pin cross member void therethrough wherein the pin cross member void is substantially larger than a pin in a horizontal direction so as to allow substantial movement of the cross member in relation to the hitch receiver when the cross member is coupled to the hitch receiver via the pin; and
   d) a resilient buffer member having an outer surface smaller than an inner surface of the hitch receiver so as to positionably fit therewithin and mitigate shock impact between the cross member and the hitch receiver; and
   e) wherein the resilient buffer member comprises a vertical pin cross member void aligned with the transverse pin receiver void.

2. The modular trailer hitch as recited in claim 1 wherein the resilient buffer member comprises a unitary malleable component.

3. The modular trailer hitch as recited in claim 1 wherein the resilient buffer member comprises a compression spring.

4. The modular trailer hitch as recited in claim 1 wherein the resilient buffer member comprises a hydraulic cylinder, pneumatic cylinder, or compression spring.

5. The modular trailer hitch as recited in claim 1 wherein the outer surface of the resilient buffer member is substantially smaller vertically and/or transversely than the inner surface of the hitch receiver so as to allow for vertical and/or transverse expansion of the resilient buffer member as the resilient buffer member contracts longitudinally.

\* \* \* \* \*